US012581257B1

(12) United States Patent
Fantuz et al.

(10) Patent No.: US 12,581,257 B1
(45) Date of Patent: Mar. 17, 2026

(54) SYSTEMS AND METHODS FOR AUDIO SOURCE LOCALIZATION IN A MULTI-SPEAKER SYSTEM

(71) Applicant: Datavault AI Inc., Beaverton, OR (US)

(72) Inventors: Mitchell Fantuz, Beaverton, OR (US); Kenneth A. Boehlke, Beaverton, OR (US); Jason R. Abele, Beaverton, OR (US)

(73) Assignee: DATAVAULT AI INC., Beaverton, OR (US)

( * ) Notice: Subject to any disclaimer, the term of this patent is extended or adjusted under 35 U.S.C. 154(b) by 67 days.

(21) Appl. No.: 18/222,319

(22) Filed: Jul. 14, 2023

Related U.S. Application Data

(60) Provisional application No. 63/389,147, filed on Jul. 14, 2022.

(51) Int. Cl.
*H04R 29/00* (2006.01)
*G01S 11/14* (2006.01)
(52) U.S. Cl.
CPC ............ *H04R 29/002* (2013.01); *G01S 11/14* (2013.01); *H04R 2201/401* (2013.01); *H04R 2430/23* (2013.01)
(58) Field of Classification Search
CPC .............. H04R 29/02; H04R 2201/401; H04R 2430/23; G01S 11/14
See application file for complete search history.

(56) References Cited

U.S. PATENT DOCUMENTS 9,426,598 B2 * 8/2016 Walsh .................... H04S 7/301

OTHER PUBLICATIONS

"IEEE Standard for a Precision Clock Synchronization Protocol for Networked Measurement and Control Systems," in IEEE Std 1588-2008 (Revision of IEEE Std 1588-2002), pp. 1-269, Jul. 24, 2008, doi: 10.1109/IEEESTD.2008.4579760.

* cited by examiner

*Primary Examiner* — Andrew Sniezek
(74) *Attorney, Agent, or Firm* — Goodhue, Coleman & Owens, P.C.

(57) ABSTRACT

Systems and methods enable audio source localization by receiving, by a processor of speaker unit in a group of networked speaker units, an audio signal associated with an audio source representing audio produced by the audio source and captured by beamforming microphones associated with the speaker unit. The processor determines an angle of arrival of the audio to the speaker unit from the audio source based at least in part on a beamforming technique associated with the beamforming microphones. The processor determines a distance of the audio source from the speaker unit based at least in part on a time of arrival of the audio at the speaker unit, and the processor determines a location of the audio source within a coordinate system associated with the group of networked speaker units.

20 Claims, 14 Drawing Sheets

1

SYSTEMS AND METHODS FOR AUDIO SOURCE LOCALIZATION IN A MULTI-SPEAKER SYSTEM

CROSS-REFERENCE TO RELATED APPLICATIONS

This application claims priority to U.S. Provisional Application No. 63/389,147 filed on 14 Jul. 2022 and entitled "SYSTEMS AND METHODS FOR AUDIO SOURCE LOCALIZATION IN A MULTI-SPEAKER SYSTEM," and is herein incorporated by reference in its entirety.

FIELD OF THE DISCLOSURE

The present disclosure is related generally to the localization of audio sources in multi-speaker systems and, in particular to a system and methods of speaker localization and user localization in a wireless network of speakers.

BACKGROUND

Modern multi-speaker audio systems may have multiple receiver units which contain both speakers and microphones. The speakers in the receiver units obtain audio from a transmission source and the microphone data is sent from the receiver units to the transmission source. Typically, such systems use a predefined and/or manually configurable equalization and/or audio targeting configuration.

SUMMARY

The present disclosure provides for novel systems and methods of audio processing that alleviate shortcomings in the art and provide novel mechanisms for accurate determination of speaker and/or user localization within the system.

In some aspects, the techniques described herein relate to a method including: receiving, by at least one processor of at least one speaker unit in a group of networked speaker units, an audio signal associated with at least one audio source; wherein the audio signal represents audio produced by the at least one audio source and captured by at least one beamforming microphone associated with the at least one speaker unit; determining, by the at least one processor, an angle of arrival of the audio to the at least one speaker unit from the at least one audio source based at least in part on at least one beamforming technique associated with the at least one beamforming microphone; determining, by the at least one processor, a distance of the at least one audio source from the at least one speaker unit based at least in part on a time of arrival of the audio at the at least one speaker unit; and determining, by the at least one processor, a location of the at least one audio source within a coordinate system associated with the group of networked speaker units.

In some aspects, the techniques described herein relate to a method, wherein the at least one audio source includes at least one user.

In some aspects, the techniques described herein relate to a method, wherein the at least one audio source includes at least one receiver speaker unit.

In some aspects, the techniques described herein relate to a method, further including: receiving, by the at least one processor, the audio signal from a plurality of other speaker units; wherein the audio signal includes a plurality of location estimates determined by the plurality of other speaker units; wherein the plurality of location estimates includes a plurality of distance estimates and a plurality of angle of arrival estimate relative to a plurality of other frames of reference associated with the plurality of other speaker units; projecting, by the at least one processor, the plurality of distance estimates onto the coordinate system; projecting, by the at least one processor, the plurality of angle of arrival estimates onto the coordinate system; determining, by the at least one processor, the angle of arrival based at least in part on a combination of the plurality of angle of arrival estimates; and determining, by the at least one processor, the distance based at least in part on a combination of the plurality of distance estimates.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
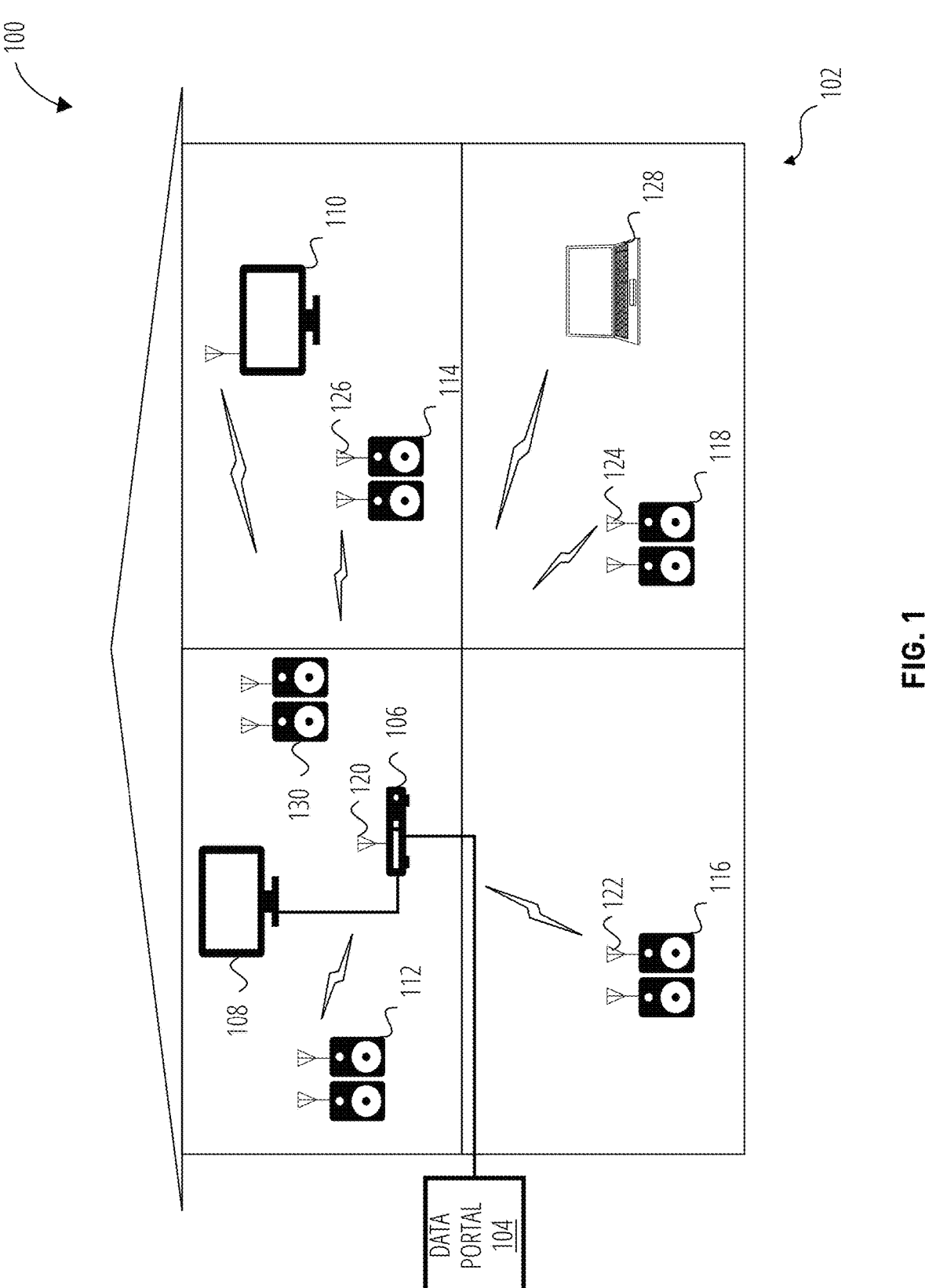
FIG. 1 is a block diagram illustrating non-limiting components of a general environment according to some embodiments of the present disclosure.

The present disclosure provides technical solutions to technical problems related to multi-speaker speaker systems, where such solutions determine the location of audio sources, such as speakers in the system and/or one or more users, relative to one or more of the speakers in the system. Such solutions enable more effective room equalization, noise suppression and/or voice localization by more effectively tuning speaker and microphone operation to target the location of the user and/or of each speaker. The present disclosure relates to systems and methods for determining a position of each speaker of a speaker system relative to a transmission source (Tx speaker unit), and for determining a relative position of a user within the speaker system relative to the Tx speaker unit and/or one or more receiver (Rx) speaker units. In some embodiments, the Rx speaker units may include one or more microphones and one or more speakers. In some embodiments, the Rx speaker units may include one or more speakers but no microphones.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

Certain embodiments will now be described in greater detail with reference to the figures.

Referring now to FIG. 1, FIG. 1 illustrates an environment 100 according to some embodiments of the present disclosure. FIG. 1 shows components of a general environment in which the systems and methods discussed herein may be practiced. Not all the components may be required to practice the disclosure, and variations in the arrangement and type of the components may be made without departing from the spirit or scope of the disclosure.

According to some embodiments, in a building or residence 102 data, including video and audio data, may be retrieved from a storage medium, such as a DVD by a DVD player or from a data portal 104 connected to, for example, a wide area fiber optic network or a satellite receiver, and distributed throughout the residence. For example, in some embodiments, digital video and/or multi-channel audio may be distributed from a source 106 (e.g., DVD player, gaming console, computer, mobile device, and the like) for presentation by displays 108 and 110 and/or surround sound or stereo speaker units 112, 114, 116, 118 through 130 in different rooms of residence 102. In some embodiments, at least part of the distribution network may comprise one or more radio transmitters 120 which may be part of a source 106 and one or more radio receivers 122, 124 through 126 which may be incorporated in the networked devices such as a computer 128, a video display 110, or the speakers 112, 114, 116 through 118 of one or more a stereo or surround sound systems.

As will be noted, in some embodiments, synchronization of the various outputs and minimization of system latency may be essential to high quality audio/video systems. As will be further noted, source-to-output delay or latency ("lip-sync") is important in audio/video systems, such as home theater systems, where a slight difference (e.g., on the order of 50 milliseconds (ms) or less) between display of a video sequence and the output of the corresponding audio is noticeable. On the other hand, the human ear is even more sensitive to phase delay or channel-to-channel latency between the corresponding outputs of the different channels of multi-channel audio. In some embodiments, channel-to channel latency greater than a phase delay threshold associated with a delay which may result in the perception of disjointed or blurry audio, such as, e.g., 0.5, 1.0, 1.5, 2.0 microsecond (μs), or other delay.

Audio video bridging (AVB) may include a set of technical standards providing specifications for time-synchronized, low latency, streaming services over networks. According to some embodiments, in an AVB network, each network endpoint (e.g., a network node capable of transmitting and/or receiving a data stream) may include two clocks-a "wall" clock and a "media" or "sample" clock. In some embodiments, the wall clock outputs wall time that may determine the real or actual time of an event's occurrence and/or the real or actual time difference between the initiation of a task and the task's completion. In some embodiments, a sample clock may refer to a temporal and/or sequential measurement within media or a sample, such as in-sample time, a frame counter, a sample counter, bits over a period, or other measure indicative of progress and/or location within a sample. Thus, the sample clock may be an alternating signal which may control the rate at which data is passed to a media processing device for processing. For examples, in an embodiment, in a digital audio system, a sample clock may govern the rate at which an analog signal is sampled and the rate at which digital samples are to be passed to a digital-to-analog converter (DAC) controlling the emission of sound by a speaker.

Figure 2:
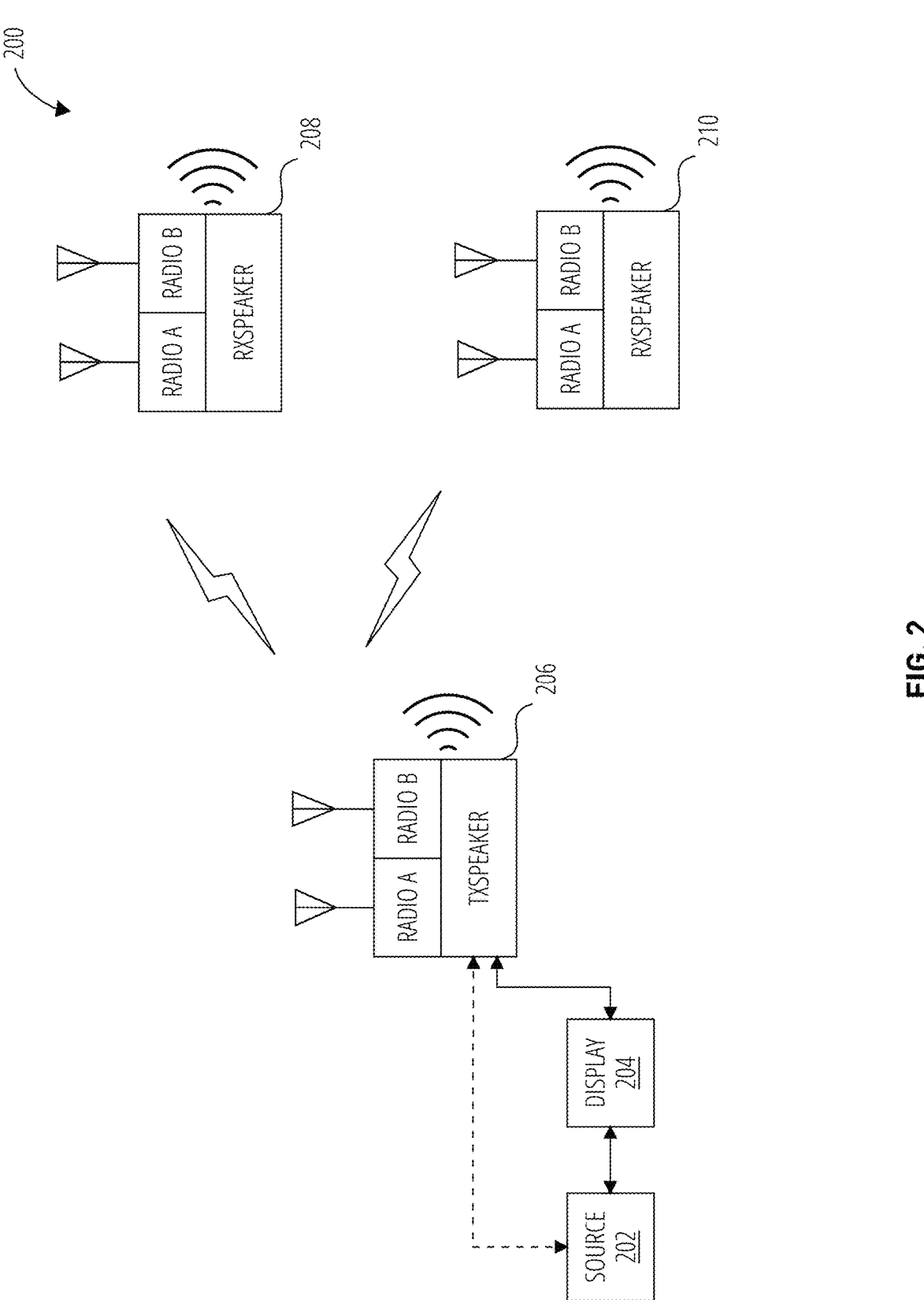
FIG. 2 is a block diagram illustrating components of data transmission network according to some embodiments of the present disclosure.

In general, with reference to FIG. 2, a system 200 in accordance with an embodiment of the present disclosure is shown. FIG. 2 shows components of a general environment in which the systems and methods discussed herein may be practiced. Not all the components may be required to practice the disclosure, and variations in the arrangement and type of the components may be made without departing from the spirit or scope of the disclosure. In some embodiments, different components of system 200 may be combined into a single device.

As shown, system 200 of FIG. 2 may include a data source 202, display 204, a transmitter-speaker (Tx speaker unit) 206, and one or more receiver-speakers (e.g., Rx speaker unit 208 and 210). In some embodiments, source 202 may be a source of digital audio and/or video. In some embodiments, source 202 may transmit an audio/video stream including a plurality of packets. In some embodiments, source 202 may be a media player, a gaming console, a mobile device, or any other device capable of reproducing and/or transmitting media. In some embodiments, an audio/video stream may be provided to a display 204 for displaying (e.g., a television, a projector, a display monitor) visual media associated with the audio/video stream.

For example, in an embodiment, where the source 202 is a gaming console, source 202 may transmit audio and/or graphics corresponding to gameplay to the display 204. In turn, display 204 may display the graphics. In some embodiments, an audio component of a media stream may be transmitted directly from the source 202 to the Tx speaker unit 206. In some embodiments, the media steam may be transmitted from the source 202 to the display 204 and, in turn, the display 204 may transmit audio information corresponding to the media stream to the Tx speaker unit 206.

According to some embodiments, Tx speaker unit 206 may process the audio information and transmit the processed or transformed audio information to the one or more Rx speaker unit (e.g., 208 and Rx speaker unit 210).

According to some embodiments, system 200 may be a multi-radio architecture. In some embodiments, data transmitters and receivers of system 200 may utilize one or more radio chains to communicate. For example, in the non-limiting embodiment of FIG. 2, Tx speaker unit 206 and Rx speaker unit 208 and 210 have two radio chains Radio A and Radio B. In some embodiments, Tx speaker unit 206 and Rx speaker unit 208 and 210 may have one or more radio chains.

In an embodiment, Tx speaker unit 206 and Rx speaker units 208 and 210 may communicate through independent radio chains. For example, in some embodiments, Tx speaker unit 206 may communicate with Rx speaker units 208 and 210 through Radio A, Radio B, or both. It will be noted that, in some embodiments, any radio chain of Tx speaker unit 206 and Rx speaker units 208 and 210 may communicate with any other radio chain. For example, in some embodiments, Tx speaker unit 206 may use Radio A to communicate with Radio B of Rx speaker unit 208 while communicating with Radio A of Rx speaker unit 210. In some embodiments, any Tx speaker unit or Rx speaker unit may communicate with any other of Tx speaker unit or Rx speaker unit using any type of digital communications (including wired and wireless) known or to be known without departing from the scope of the present disclosure.

According to some embodiments, Radio A and Radio B may use Channel A and Channel B, respectively. In some embodiments, Channel A and Channel B may have a channel frequency. In some embodiments, Channel A and Channel B may be separated in channel frequency or band of operation (e.g., Frequency Diversity). In some embodiments, Channel A and Channel B may in the same band but have different bandwidths (e.g., 20/40/80/160 MHz bandwidth in 802.11ac). In some embodiments, Channel A and Channel B may be separated in time (e.g., Temporal Diversity). That is, in some embodiments, data packets may be sent over Channel A and/or Channel B at a different time slots to overcome a burst interference that has interfered with a primary time slot.

According to some embodiments, Channel A and Channel B may be separated in a Modulation Coding Scheme (e.g., Coding Diversity). That is, in some embodiments, data packets may be sent using different physical layer rates of a wireless network protocol, such as Wi-Fi, Bluetooth™, Zigbee, Z-Wave, among others or any combination thereof. For example, in some embodiment, a physical layer rate may be 1, 2, 3, 4, 5, 6, 7, 8, 9, 10 or more Mbps using Binary Phase-Shift Keying (BPSK) and a coding rate of, e.g., $\frac{1}{10}$, $\frac{1}{9}$, $\frac{1}{8}$, $\frac{1}{7}$, $\frac{1}{6}$, $\frac{1}{5}$, $\frac{1}{4}$, $\frac{1}{3}$, $\frac{1}{2}$, $\frac{2}{3}$, $\frac{3}{4}$, $\frac{2}{5}$, $\frac{3}{5}$, $\frac{4}{5}$, $\frac{5}{6}$, etc., such as $\frac{1}{2}$. In some embodiments, a physical layer rate may be 54 Mbps using 64-QAM scheme and a coding rate of, e.g., $\frac{1}{10}$, $\frac{1}{9}$, $\frac{1}{8}$, $\frac{1}{7}$, $\frac{1}{6}$, $\frac{1}{5}$, $\frac{1}{4}$, $\frac{1}{3}$, $\frac{1}{2}$, $\frac{2}{3}$, $\frac{3}{4}$, $\frac{2}{5}$, $\frac{3}{5}$, $\frac{4}{5}$, $\frac{5}{6}$, etc., such as $\frac{3}{4}$.

According to some embodiments, Channel A and Channel B may have different communication methods (e.g., Broadcast/Multicast versus Unicast). In some embodiments, where the channel communication method is Broadcast/Multicast, data packets may be transmitted to multiple receivers at the same time. In some embodiments, where the channel communication method is unicast, a transmitter may transmit data packets to individual receivers independently. It will be noted that as used herein, any of Tx speaker unit 206, Rx speaker unit 208, and Rx speaker unit 210 may act be a receiver, a transmitter, or both.

According to some embodiments, Channel A and Channel B may have different retransmission methods (e.g., User Datagram Protocol (UDP), Transmission Control Protocol/Internet Protocol (TCP/IP)). In some embodiments, where the retransmission method is UDP, data packets may be sent without acknowledgment. In some embodiments, where the retransmission method is TCP/IP, acknowledgment of packet loss and retransmission of lost packets is supported.

According to some embodiments, Channel A and Channel B may use different radio Physical Layers (e.g., Orthogonal Frequency Domain Multiplexing (OFDM) as disclosed in 802.11a/n/ac, Frequency Hopping Spread Spectrum (FHSS) as disclosed by the Bluetooth standard, and Code Division Multiple Access (CDMA) as disclosed in 802.11b). In some embodiments, different Physical Layers can cover the same frequency band but use different medium access methods and spectral reuse properties. For example, in some embodiments, 802.11g and Bluetooth both share the 2.4 GHz Band, however, 802.11g may move from one 20 MHz Channel to another while Bluetooth dynamically may hop over an entire 80 MHz band in one packet period.

Figure 3:
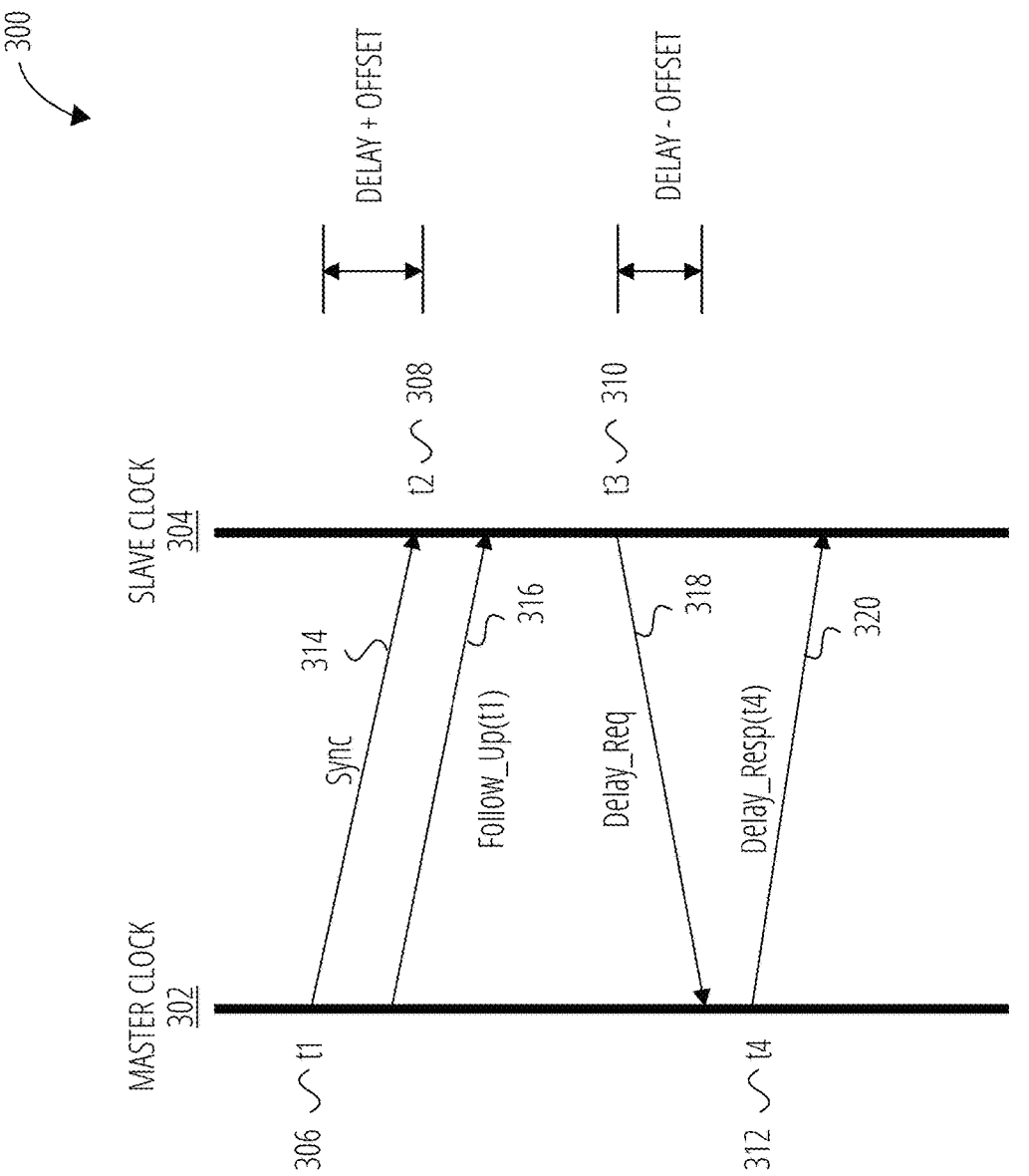
FIG. 3 illustrates a method for synchronizing clocks among devices in a network according to some embodiments of the present disclosure.

Referring now to FIG. 3, FIG. 3 illustrates a method for synchronizing clocks among devices in a network according to some embodiments of the present disclosure. FIG. 3 illustrates a Precision Time Protocol (PTP) of "IEEE Standard for a Precision Clock Synchronization Protocol for Networked Measurement and Control Systems," IEEE Std. 1588-2008 (hereinafter "IEEE Standard for a Precision Clock Synchronization Protocol") which is incorporated herein by reference in its entirety. The IEEE Standard for a Precision Clock Synchronization Protocol provides, inter alia, a method 300 of synchronizing a wall time at "secondary" clock 304 distributed among the nodes of a network to a wall time of the network's "primary" clock 302.

According to some embodiments, when operation of a network is initiated, a primary clock 302 may be selected either manually or by a "best primary clock" algorithm. Afterward, messages may be periodically exchanged between a device comprising the primary clock 302 (e.g., the "primary device") and the network devices comprising the secondary clocks 304 (e.g., the "secondary devices") enabling determination of an offset, the time by which a secondary clock leads or lags the primary clock, and the network delay, the time required for data packets to traverse the network.

In some embodiments, at defined intervals (e.g., two second intervals) the primary device may multicasts a Sync message 314 to the other network devices. In some embodiments, the precise primary clock 302 wall time of the Sync message's transmission, t1 306, is determined and included as a timestamp in either the Sync message 314 or in a Follow-Up message 316. In some embodiments, the secondary device determines the local wall time, t2 308, at which the device received the Sync message 314.

In some embodiments, a Delay_Req message 318 may then be sent by the secondary device to the primary device at time, t3 310. In some embodiments, the primary clock's time of receipt, t4 312, of the Delay_Req message 318 is determined and the primary device responds with a Delay_Resp message 320 which includes a timestamp indicating t4 312. In some embodiments, the secondary device may then determine the network delay and the secondary clock's offset. In some embodiments, the secondary clock's offset may be algorithmically determined using one or more of the four times, t1 306, t2 308, t3 310, and t4 312. In some embodiments, the secondary clock's offset may be determined according to the following set of equations:

$$\text{Delay}+\text{Offset}=t2-t1 \tag{1}$$

$$\text{Delay}-\text{Offset}=t4-t3 \tag{2}$$

$$\text{Delay}=((t2-t1)+(t4-t3))/2 \tag{3}$$

$$\text{Offset}=((t2-t1)-(t4-t3))/2 \tag{4}$$

In some embodiments, consecutive measurements of the offset also permit compensation for the secondary clock's frequency drift. In some embodiments, with the time and frequency drift determined, each secondary clock may be adjusted to match the wall time of the primary clock by adding or subtracting the offset to or from the local wall time and adjusting the secondary clock's frequency.

In some embodiments, the technical specifications for a wireless networking technology (such as IEEE 802.11, Bluetooth®, Zigbee, Z-Wave, Matter and/or Thread, among others or any combination thereof) may provide media access control (MAC) and physical layer (PHY) specifications for implementing wireless local area networks (WLAN) referred to basic service sets (BSS). The devices which are parts of a BSS are identified by a service set identification (SSID) which may be assigned or established by the device which starts the network. In some embodiments, each network device or station includes a local timing synchronization function (TSF) timer. In some embodiments, the device's wall clock may be based on a clock having sufficient precisions to resolve delays to be below human perception, such as a clock which ticks in microseconds including, e.g., a 1 mega-Hertz (MHz) clock. In some embodiments, during a beacon period, some or all stations in an independent basic service set (IBSS) may compete to transmit a beacon. In some embodiments, each station may calculate a random delay interval and may set a delay timer scheduling transmission of a beacon when the timer expires. In some embodiments, if a beacon arrives before the delay timer expires, the receiving station may cancel its pending beacon transmission. In some embodiments, the beacon may comprise a beacon frame including a timestamp indicating the TSF timer value (e.g., the wall time) of the station that transmitted the beacon. In some embodiments, upon receiving a beacon, if the timestamp is later than the receiving station's TSF timer, the receiving station may set its TSF timer (e.g., the wall clock), to the value of the timestamp thus synchronizing the TSF timers (e.g., the wall clocks) of the transmitting station and the receiving station.

In some embodiments, PTP and TSF are responsible for synchronizing the wall clocks of all nodes in the respective network to the same wall time but not for synchronizing the sample clocks controlling the processing of the various media transported by the network. In some embodiments, the sample clocks may be recovered from the data stream at each of the network's listeners (e.g., endpoints receiving the data stream) enabling different sample clocks for different media to be transported on the same network.

Figure 4:
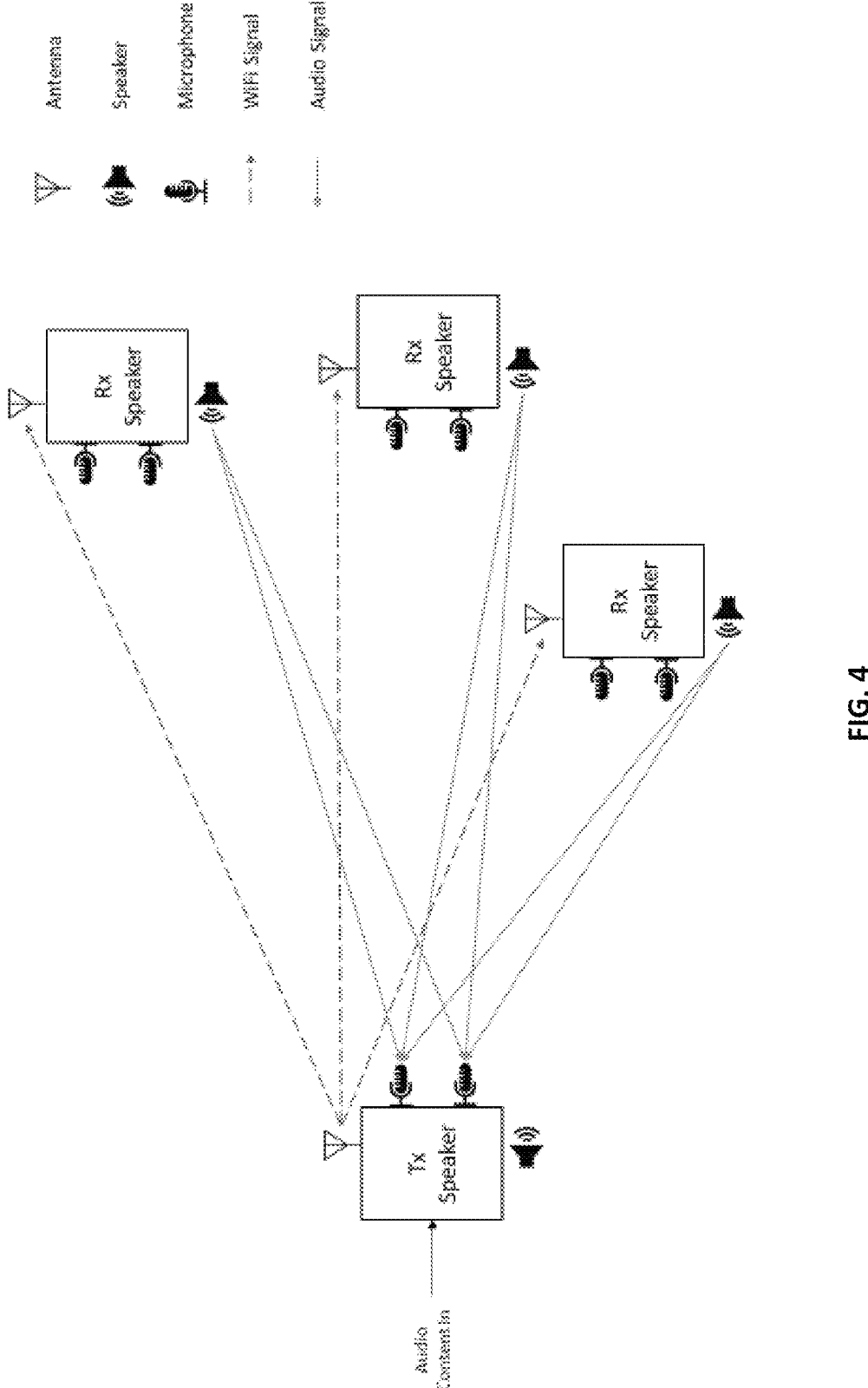
FIG. 4 depicts a multi-speaker device speaker system where each speaker device includes one or more microphones and a speaker in accordance with one or more embodiments of the present disclosure.

Referring to FIG. 4, a block diagram illustrates an exemplary Wi-Fi based multi-speaker device speaker system where each speaker device includes one or more microphones and a speaker in accordance with one or more embodiments of the present disclosure.

In some embodiments, a multi-speaker audio system may have wireless satellite units which include both speakers and microphones. The speakers in the satellite units may obtain audio from a Tx speaker unit via a Forward Link and the microphone data is sent from the Rx speaker unit to the Tx speaker unit through the Reverse Link. The Tx speaker unit may be coupled to the television or the internet or other suitable audio source or any combination thereof. In some configurations the Tx speaker unit function is located inside the audio source device. In some embodiments, as shown in FIG. 4, the Tx speaker unit may transmit audio data in a multi-cast manner, meaning each speaker receives the audio that is to be played on every speaker, not just its own.

In some embodiments, technical difficulties with Wi-Fi based multi-speaker device speakers systems include:

locating the speakers in relation to each other, or in relation to the center Tx speaker unit so as to provide improvements, which include, but are not limited to, room equalization, noise suppression, and voice localization.

locating a user within the field of speakers so as to provide improvements, which include, but are not limited to, adjust the room EQ for different users at different positions, room equalization, noise suppression and voice localization.

In some embodiments, speaker system can vary in terms of what hardware is available. Some systems may only have microphones located at the Tx speaker unit and no microphones located at the Rx speaker unit. Other systems may have microphones located at the Tx speaker unit and Rx speaker unit.

FIG. 4 is an example of a multi-speaker system, in which there are 4 speakers, one being a Tx speaker unit which sends audio data to the other speakers which are Rx speaker units over a wireless medium. The audio content that enters the Tx speaker unit could come from a variety of sources. Each speaker also contains multiple microphones, in this case, 2 microphones per speaker. Other arrangements having any number of Tx speakers and/or Rx speakers are possible with any number of one or more microphones per speaker.

Figure 5:
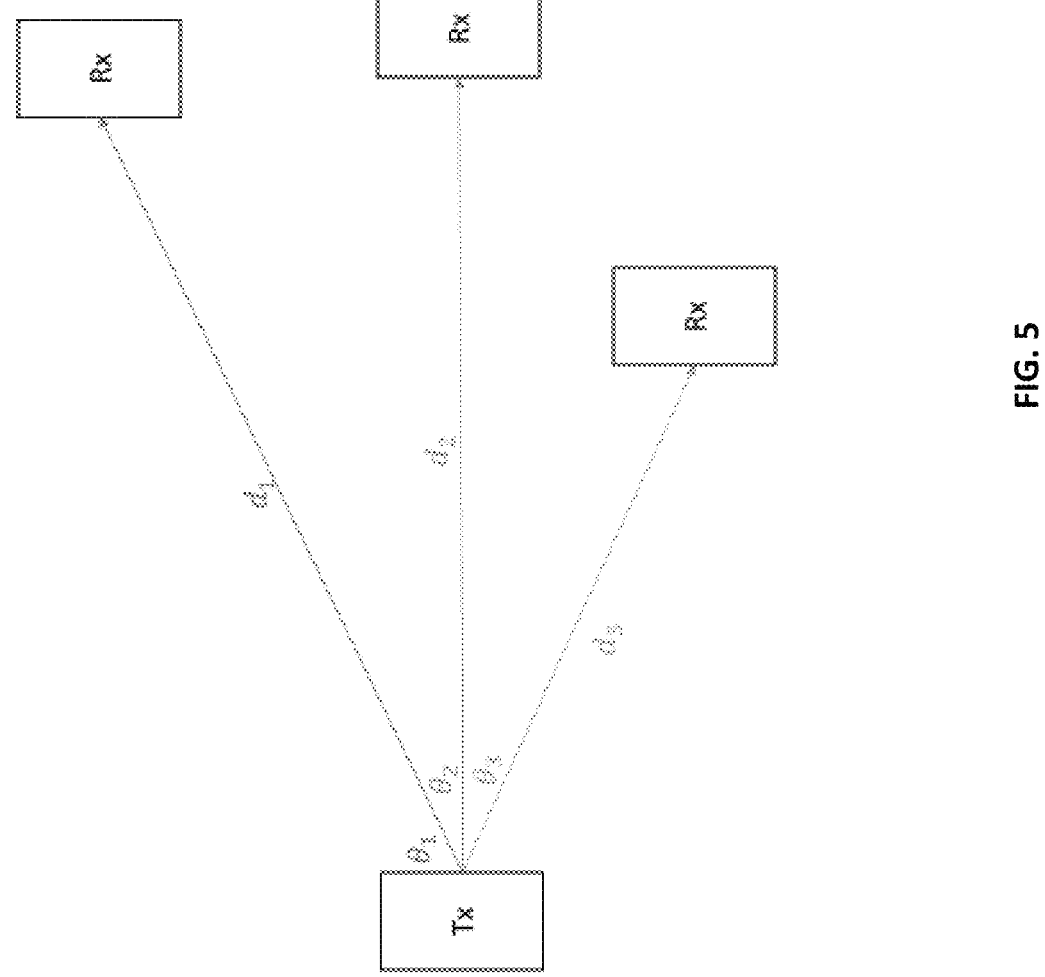
FIG. 5 illustrates user localization based on distance and angle from each receiver speaker device to a transmitter speaker device in accordance with one or more embodiments of the present disclosure.

Referring to FIG. 5, a block diagram illustrates user localization based on distance and angle from each receiver speaker device to a transmitter speaker device in accordance with one or more embodiments of the present disclosure.

In some embodiments, the speaker locations can be thought of as a 2D grid, and it is desired to locate where each speaker is in relation to one another. To do so, the distance and angle between each speaker may be computed. FIG. 5 shows the angle and distance from the Tx speaker unit to Rx speaker unit i as $\theta_i$ and $d_i$ respectively. Cartesian coordinates $(x_i, y_i)$ can also be computed using the angle and distance away.

Figure 6:
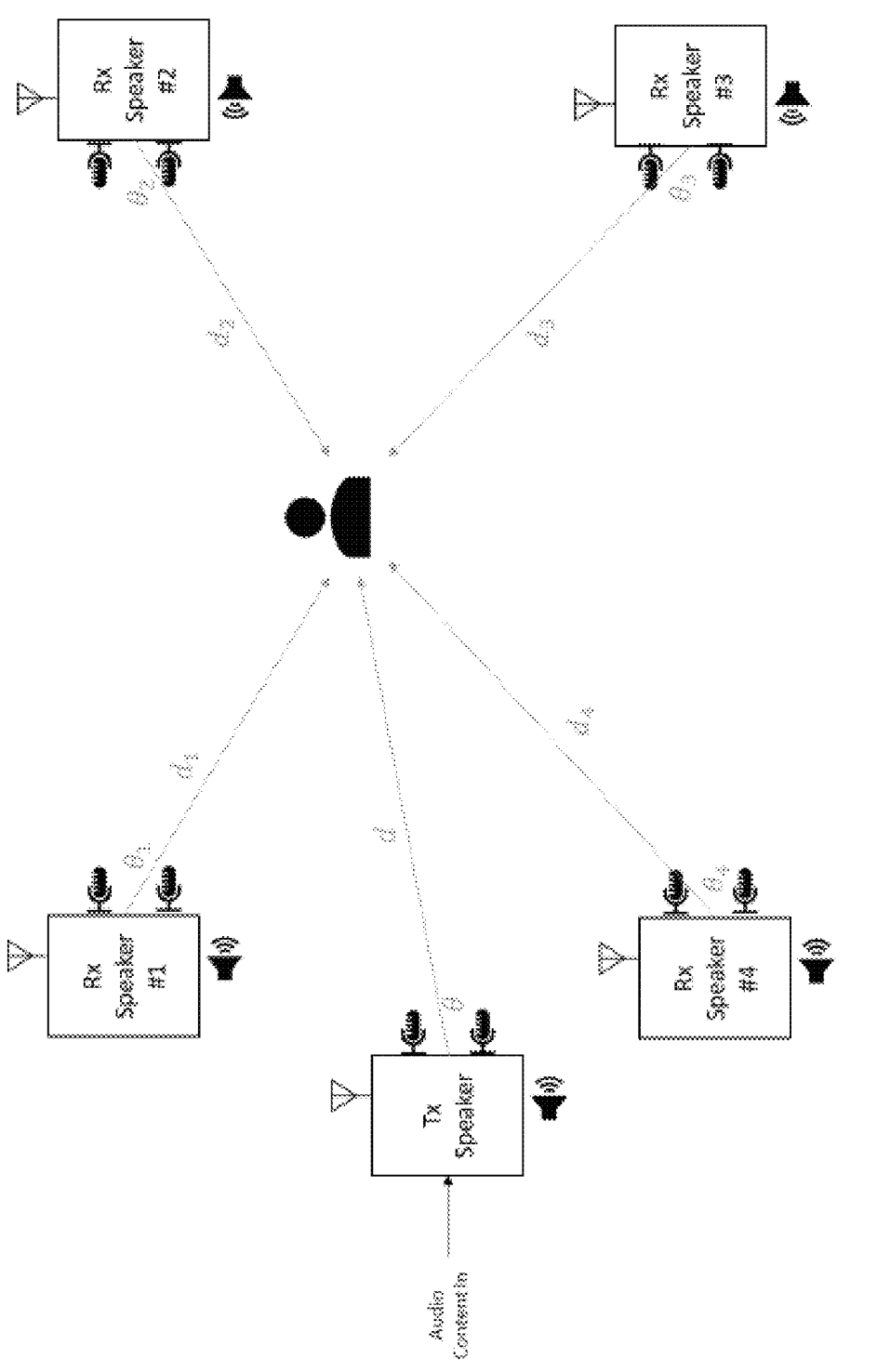
FIG. 6 illustrates user localization in a speaker system in accordance with one or more embodiments of the present disclosure.

Referring to FIG. 6, a block diagram illustrates user localization in a speaker system in accordance with one or more embodiments of the present disclosure.

In some embodiments, in addition to localizing each speaker in the system, the user location may also be determined within the 2D grid as shown in FIG. 6 and the distance and angle from each speaker may be computed.

Figure 7:
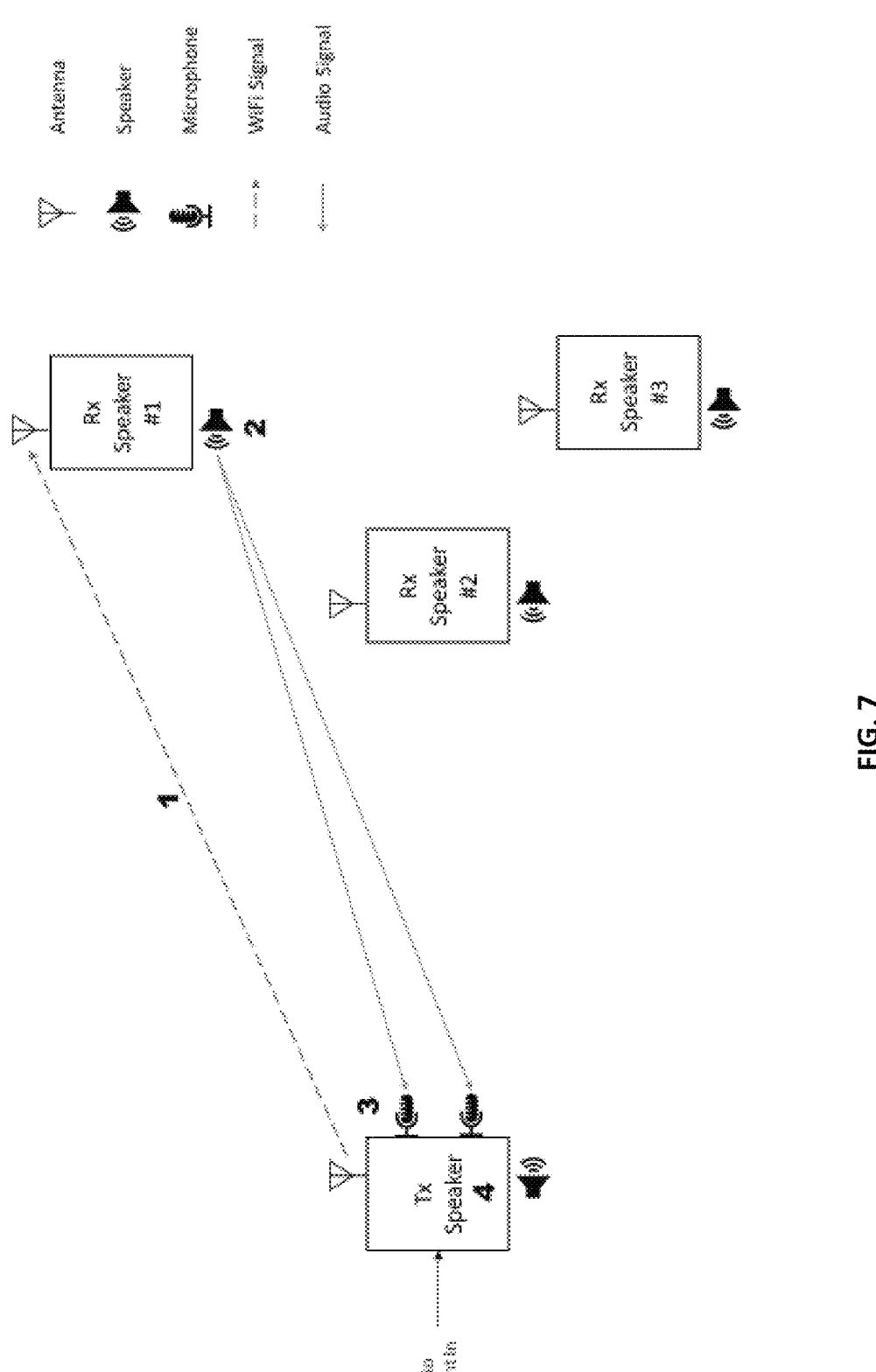
FIG. 7 depicts a multi-speaker device speaker system for speaker localization with microphones in a transmitter speaker device in accordance with one or more embodiments of the present disclosure.

Referring to FIG. 7, a block diagram illustrates a multi-speaker device speaker system for speaker localization with microphones in a transmitter speaker device in accordance with one or more embodiments of the present disclosure.

Figure 8:
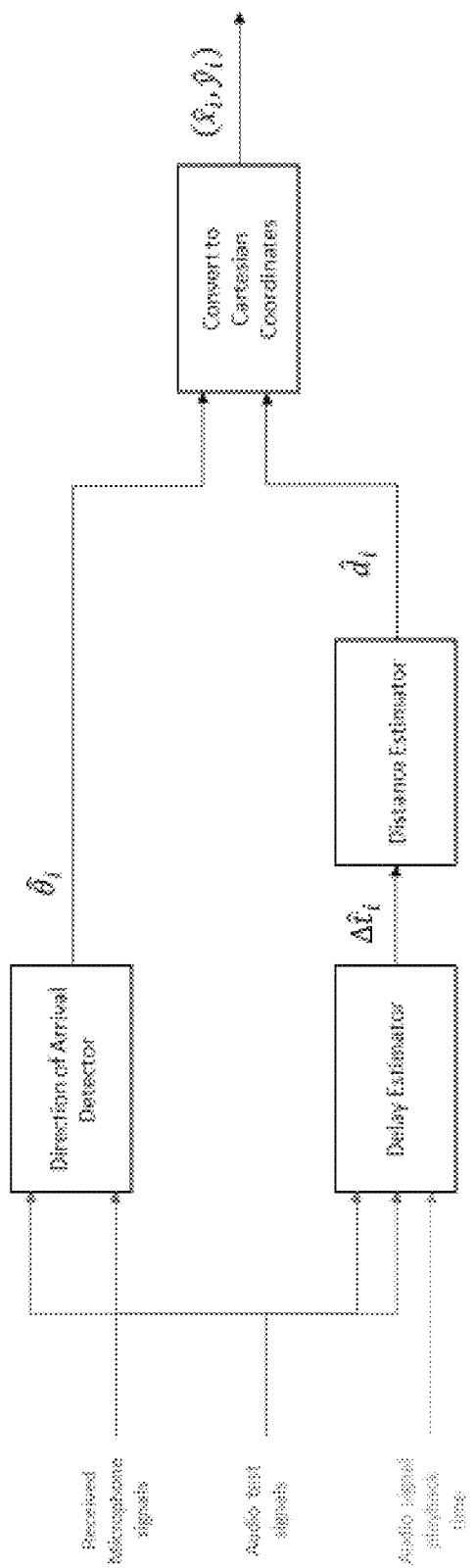
FIG. 8 depicts a block diagram for determining a receiver speaker location relative to a transmitter in accordance with one or more embodiments of the present disclosure.

In some embodiments, for the case of microphones only located at the Tx speaker unit, the process flow is shown in FIG. 7. The processing to locate Rx speaker unit 1 may include:

1) Send test signal and playback time over the wireless network from Tx speaker unit 2) to Rx speaker unit 1
3) Play audio at Rx speaker unit 1 at needed play time
4) Receive played audio at Tx speaker unit microphones
5) Process microphone data at Tx speaker unit to locate speaker, highlighted in FIG. 8 as described below
6) Repeat steps 1-4 for other Rx speaker units Referring to FIG. 8, a block diagram illustrates determining a receiver speaker location relative to a transmitter where the transmitter has microphones in accordance with one or more embodiments of the present disclosure.

In some embodiments, when the Tx speaker unit receives the test signal at its microphones, processing is used to find the direction of arrival and distance for that Rx speaker unit.

In some embodiments, the processing for speaker localization may include using a Direction of Arrival Detector that processes the microphone data and the original audio test signal to determine the angle at which the audio signal is coming from. Beamforming techniques such as delay-sum or minimum variance methods are strong, and can determine the angle of arrival for narrowband test signals. These beamforming techniques can be used in the time domain or frequency domain. This also is scalable and performs better as the number of microphones increases.

In some embodiments, the processing for speaker localization may include using a Delay Estimator estimates the delay from when the audio test signal was played at the Rx speaker unit, and when the audio test signal was received at the Tx speaker unit microphone. This delay estimation can be done by using the TSF time that is synchronous between the Tx speaker unit and Rx speaker units. When the test signal arrives at the Tx speaker unit microphones, the TSF time can be read at the Tx speaker unit and then compared to when the TSF time was at the Rx speaker unit when the signal was played. The difference between these values may form the estimated time delay.

In some embodiments, the processing for speaker localization may include using a Distance Estimator takes the estimated time delay and computes the distance from the Tx speaker unit to the Rx speaker unit. This is done by knowing the speed of sound in air (~343 m/s) and the time difference.

In some embodiments, the processing for speaker localization may include Converting to Cartesian Coordinates. Converting to Cartesian coordinates may be a simple conversion from polar coordinates (d, θ) to (x, y). In some embodiments, any suitable coordinate system may be employed.

Figure 9:
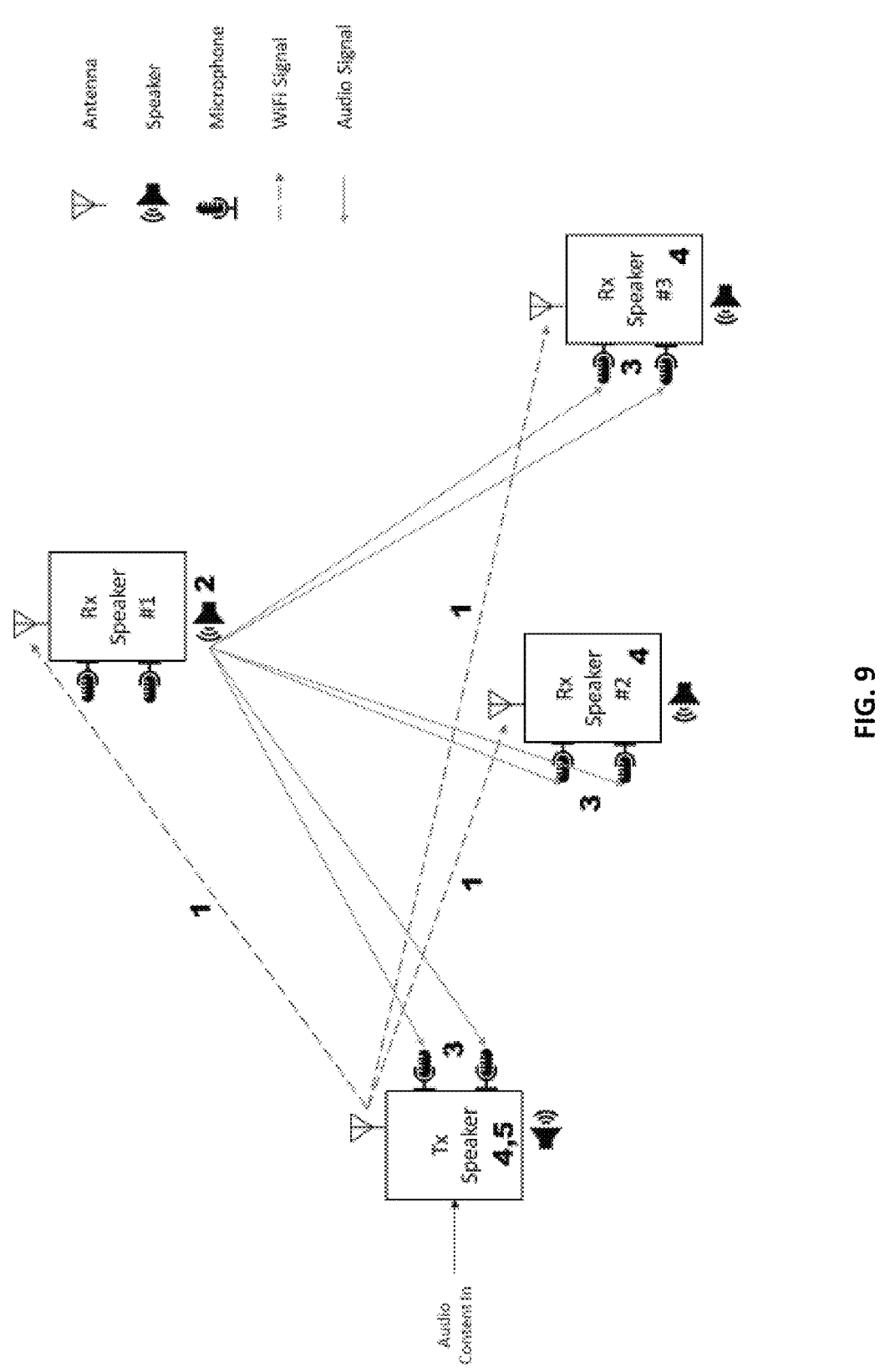
FIG. 9 depicts a wirelessly connected speaker system having multiple receiver units including microphones and speakers and a transmission unit having microphones and speakers in accordance with one or more embodiments of the present disclosure.

Referring to FIG. 9, a block diagram illustrates speaker localization in a wirelessly connected speaker system having multiple receiver units including microphones and speakers and a transmitter unit having microphones and speakers in accordance with one or more embodiments of the present disclosure.

Figure 10:
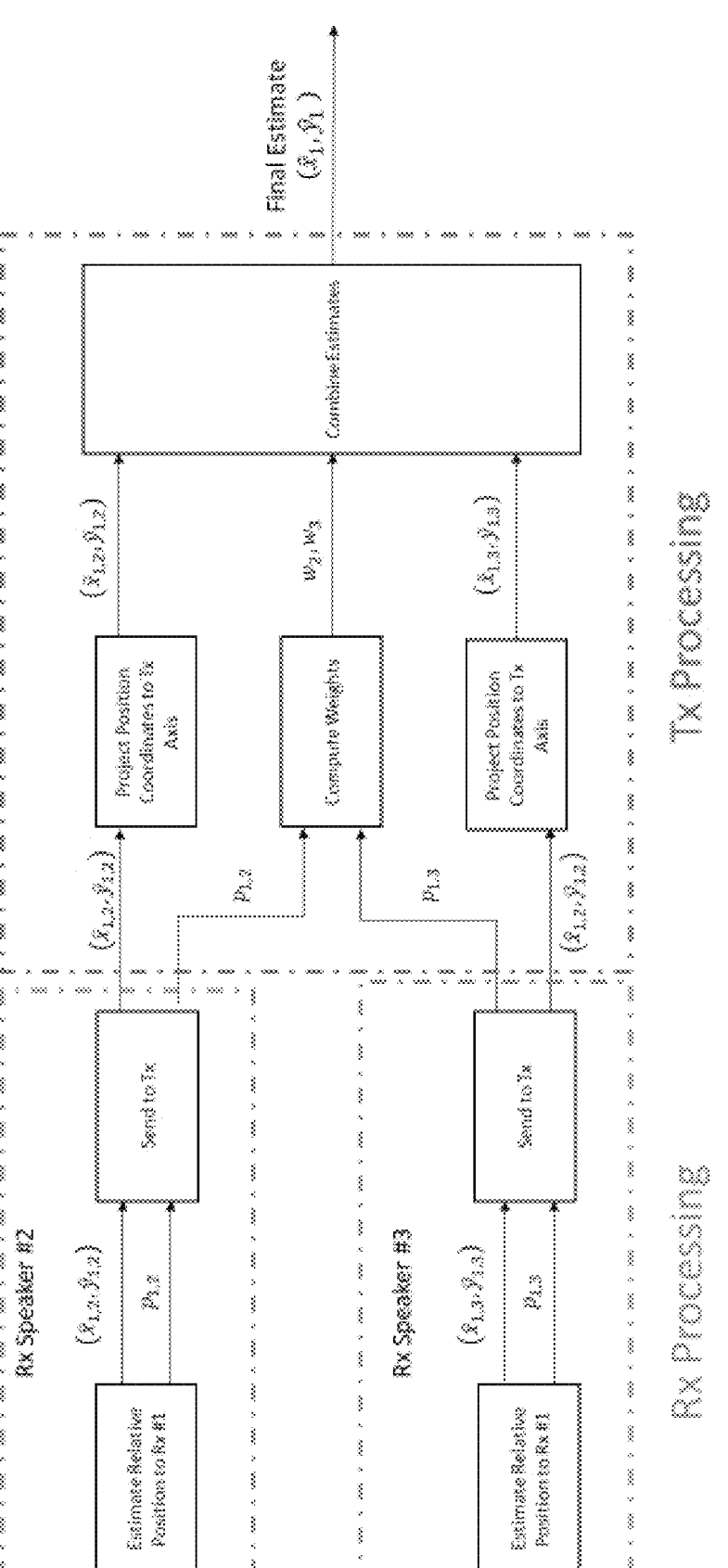
FIG. 10 depicts a block diagram for speaker localization by combining position estimates across receiver units of the speaker system in accordance with one or more embodiments of the present disclosure.

In some embodiments, for the case with Rx speaker units with multiple microphones, the Rx speaker units can be used to help the Tx speaker unit locate the other speakers. Due to the multicast nature of the system, each Rx speaker unit contains a copy of the audio test signal that is being played at a single speaker. With this information and timing, each Rx speaker unit can do the same processing as the Tx speaker unit to get the relative distance from itself and the speaker playing the audio test signal. For example, in FIG. 9, the Tx speaker unit, Rx speaker unit 2 and 3 can determine the location of Rx speaker unit 1 relative to themselves. In some embodiments, the processing may include steps as follows:

1) Send test signal that is to be played at Rx speaker unit 1 and playback time in multicast packets over the wireless network from Tx speaker unit to all Rx speaker unit
2) Play audio at Rx speaker unit 1 at needed play time
3) Receive played audio at all other Rx speaker unit microphones
4) Process microphone data at other Rx speaker units and Tx speaker unit (e.g., similar to FIG. 8)
5) Send estimates from Rx speaker unit to Tx speaker unit and combine to make a final estimate
6) Repeat steps 1-4 for other Rx speaker units In some embodiments, with each speaker having an estimate of the other speaker positions, this information may be sent back to the Tx speaker unit. Accordingly, in some embodiments, the Tx speaker unit may obtain an initial estimate of each Rx speaker unit position and the other Rx position estimates. The Tx speaker unit may then combine all of the estimates for each Rx speaker unit and improve the location accuracy compared to the method with microphones only at the Tx speaker unit. FIG. 10 is a summary of the flow with all speakers according to one or more embodiments of the present disclosure.

Referring to FIG. 10, a block diagram illustrates speaker localization by combining position estimates across receiver units of the speaker system in accordance with one or more embodiments of the present disclosure.

In some embodiments, before the Tx speaker unit combines the position estimates from the other Rx speaker units, the estimate from each Rx speaker unit may be converted from the Rx speaker unit frame of reference in the coordinate system in which an estimate was captured to the Tx speaker unit frame of reference in the coordinate system. For example, when estimating the position of Rx speaker unit 1, the Rx speaker unit 2 and 3 coordinates may be modified so each estimate is in relation to the Tx speaker unit rather than the Rx speaker units. In some embodiments, the reframing of each estimate may be done with vector arithmetic, and projecting the coordinates to the Tx speaker unit frame. In some embodiments, the computation may be done in the Project Position Coordinates to Tx speaker unit Axis block in FIG. 10 and the converted coordinates are $(\tilde{x}_{1,2}, \tilde{y}_{1,2})$.

In some embodiments, the Rx speaker units may not be able to obtain a precise estimate of the other speaker positions due to the room layout and/or poor line of sight to a subject speaker being located. In these situations, the Rx speaker units can compute a probability and/or confidence that the subject speaker has been located. These probabilities can be used to control the weights. This processing can be seen in FIG. 10, and the probabilities are shown as $p_{1,2}$ and $p_{1,3}$. In some embodiments, the weight computation may be done in the Compute Weights block and the combining occurs in the Combine Estimates block.

Figure 11:
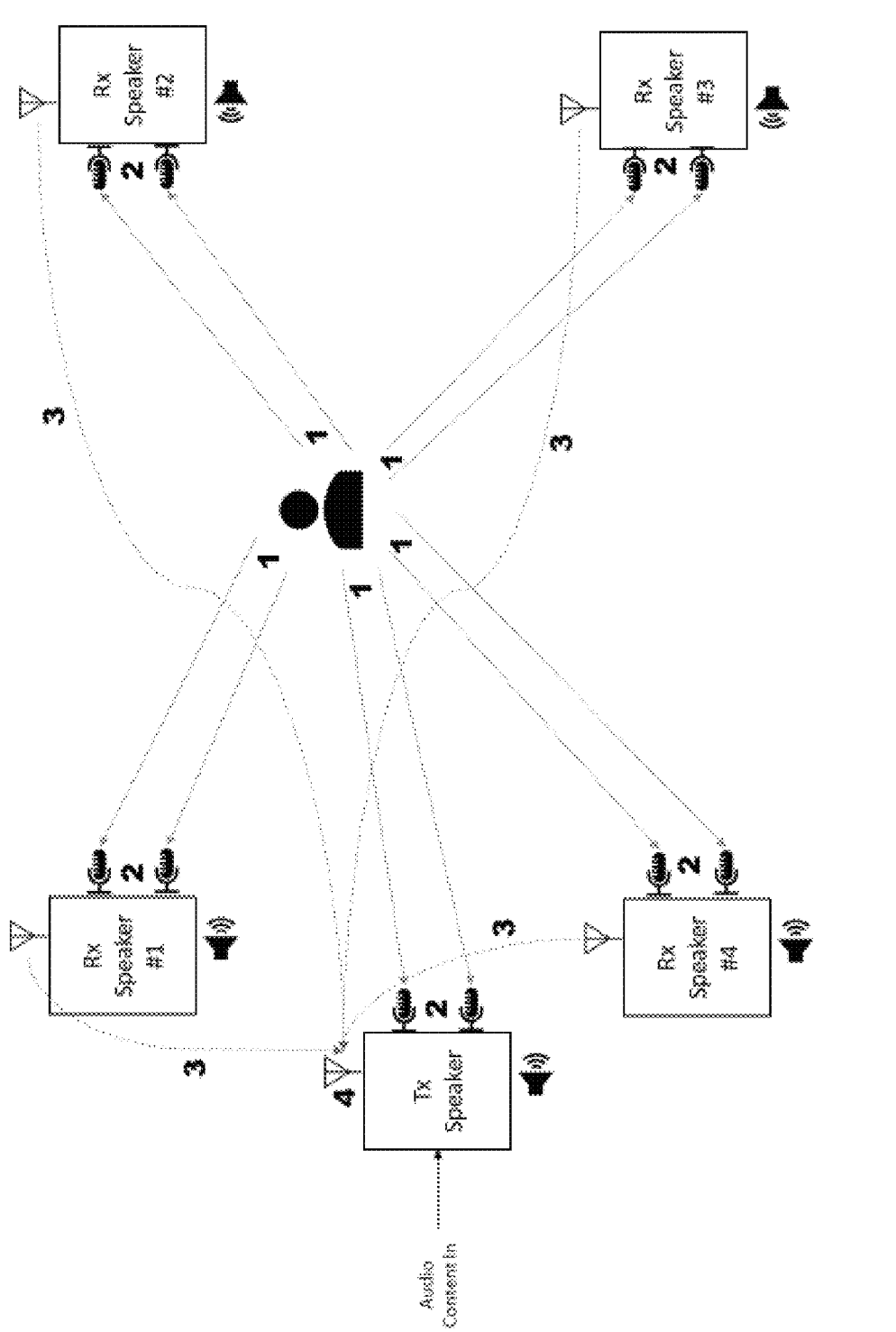
FIG. 11 depicts a processing flow for user localization in a multi-speaker speaker system in accordance with one or more embodiments of the present disclosure.

Referring to FIG. 11, a block diagram illustrates a processing flow for user localization in a multi-speaker speaker system in accordance with one or more embodiments of the present disclosure.

In some embodiments, being able to locate a user has many possible benefits in a multi-speaker system. Knowing the user's position can enhance features like voice suppression/enhancement, adjust sound EQ to enhance the sound field at that position. In some embodiments, locating a user within the speaker system may be done by leveraging the known position of all of the speakers. Each Rx speaker unit may generate an estimate on where the user is, and the estimate from each Rx speaker unit can be combined in a way similarly to what was described in the previous section. In addition, the multicast nature of the system can also be leveraged to help adjust the user's position while the system is playing audio.

In some embodiments, the processing flow for finding a user in a multi-speaker system is highlighted in FIG. 11. In some embodiments, the processing may include steps as follows:

The user plays a known audio test signal from their location. This test signal can be played/generated in a variety of ways, which includes but is not limited to, a smartphone device, dedicated speaker device, or vocally.

Figure 12:
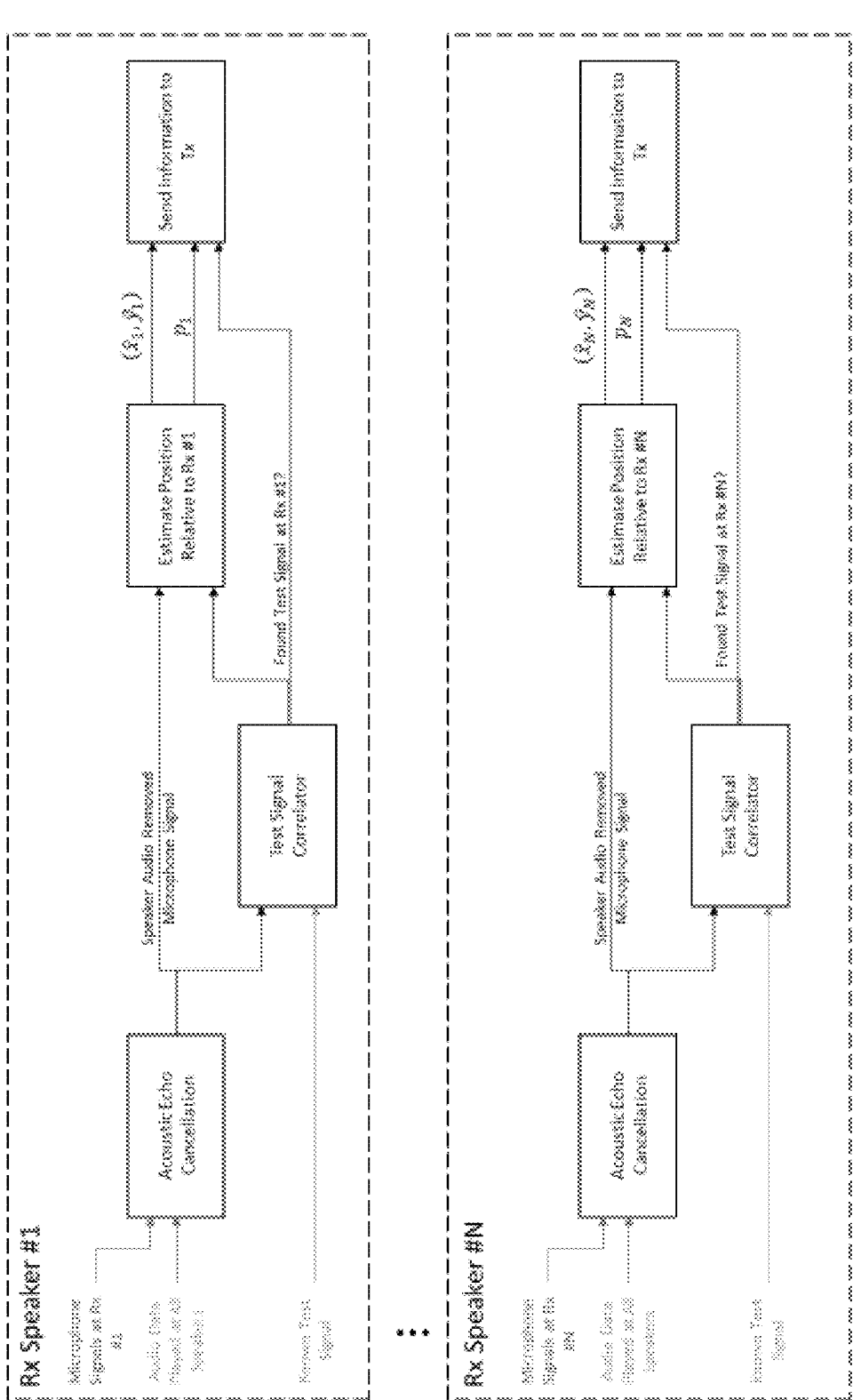
FIG. 12 illustrates a block diagram for Rx speaker unit processing at one or more receivers in a speaker system for user localization in accordance with one or more embodiments of the present disclosure.

This audio test signal is received at each Rx speaker unit microphone, and some processing is done on this microphone information to locate the user relative to that Rx speaker unit. This is outlined in FIG. 12, and further details are described with respect to Rx speaker unit processing.

The Rx speaker units send their initial estimates of the user position to the Tx speaker unit over WiFi.

The Tx speaker unit receives the estimates from all of the Rx speaker units, and processes the data to achieve an overall position estimate. This is outlined in FIG. 13 and further details are described with respect to Tx speaker unit processing Referring to FIG. 12, a block diagram illustrates Rx speaker unit processing at one or more receivers in a speaker system for user localization in accordance with one or more embodiments of the present disclosure.

In some embodiments, on each Rx speaker unit, finding where the user is located relative to that speaker position, involves similar processing described in locating the speaker positions. First, each speaker removes the audio content that is being played from the other speakers in the Acoustic Echo Cancelation block. In some embodiments, due to the Tx speaker unit sending the audio content in a multicast manner, each Rx speaker unit may have a copy of the content being played at other speakers. Using this information, the output of this block is the microphone signal without the content played at each speaker.

In some embodiments, the next processing that is performed is the Test Signal Correlator which checks the filtered microphone signal if the test signal is found. This checking can be done in a few different ways, but is not limited to, time domain cross correlation, frequency domain filtering or a mixture of the two. In some embodiments, if the test signal is found, this information is passed to the Estimate Position Relative to Rx speaker unit # block.

In some embodiments, the Estimate Position Relative to Rx speaker unit # may be the same or similar to the processing described in the previous sections. In some embodiments, the Estimate Position Relative to Rx speaker unit # may include estimating the direction of arrival and distance from the user, and converting the direction and distance to cartesian coordinates or other suitable coordinate system or any combination thereof.

In some embodiments, upon determining the direction and distance in the coordinate system, the estimated position may be sent to the Tx speaker unit in the Send Information to Tx speaker unit block.

Figure 13:
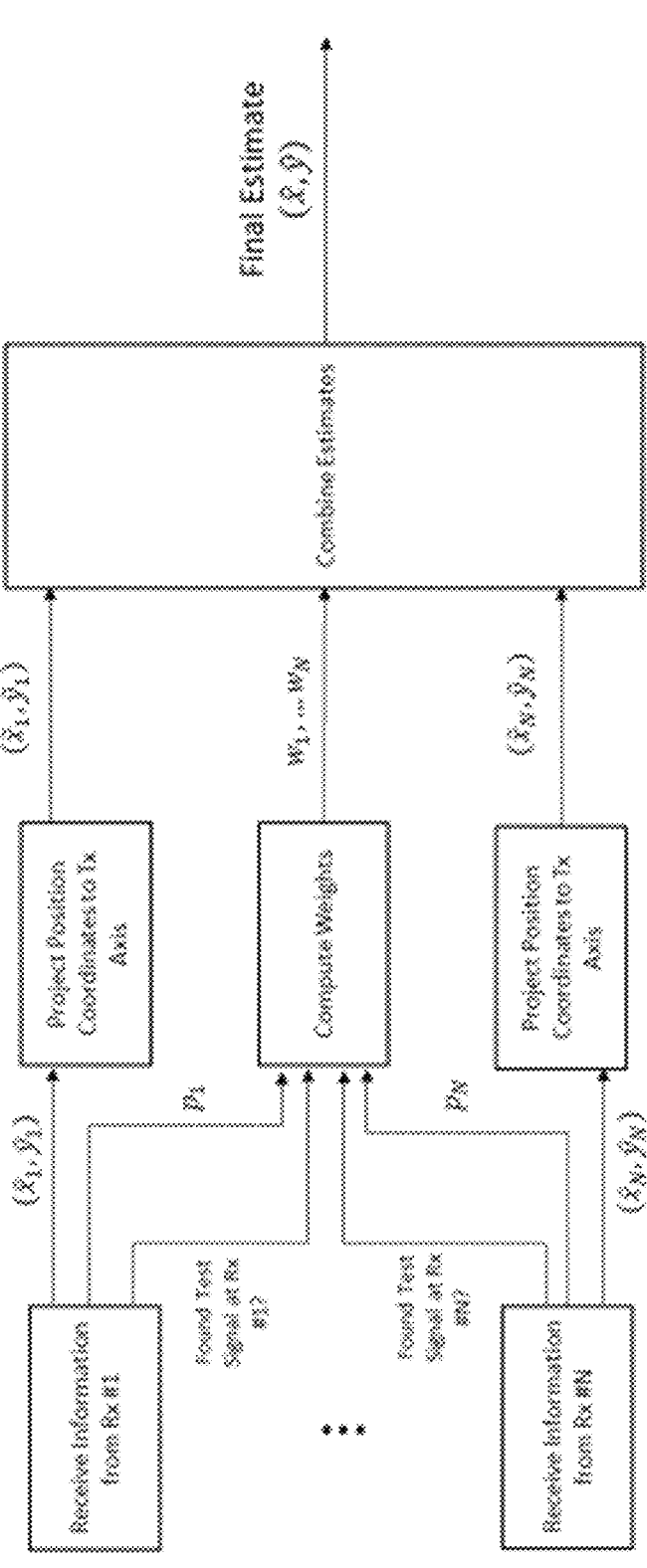
FIG. 13 illustrates a block diagram for Tx speaker unit processing at a transmitter in a speaker system for user localization in accordance with one or more embodiments of the present disclosure.

Referring to FIG. 13, a block diagram illustrates Tx speaker unit processing at a transmitter in a speaker system for user localization in accordance with one or more embodiments of the present disclosure.

In some embodiments, on the Tx speaker, the processing to find a user may be the same or similar to finding the other speaker locations. First, the Tx speaker unit may receive the information that was transmitted from each Rx speaker unit in the Receive Information from Rx speaker unit # block. This information includes the estimated position from that Rx speaker unit, $(\hat{x}_1, \hat{y}_1)$, a probability and/or confidence that the subject speaker has been located (e.g., as described above), $p_1$, and if the subject speaker is found with the test signal at all. The probability estimates and if the test signal was found indicator could be combined into one measurement.

In some embodiments, the estimated position may be converted from the Rx speaker unit axis to the Tx speaker unit axis in the Project Position Coordinates to Tx speaker unit Axis block. In some embodiments, the Project Position Coordinates to Tx speaker unit Axis block may employ the same processing that was described in the previous section about finding other speakers.

In some embodiments, in order to combine the estimates, weights may be computed before combining the estimates. These weights may be computed in the Compute Weights block. In the Compute Weights block, the weights may depend on the probability measurement as well as if the test signal was found at a given speaker. In some embodiments, the weights used for the final estimate may be a product of only a subset of the Rx speaker units, not necessarily all of them.

In some embodiments, with the weights computed, the estimates from each speaker, or subset of speakers, is combined in the Combine Estimates block.

Figure 14:
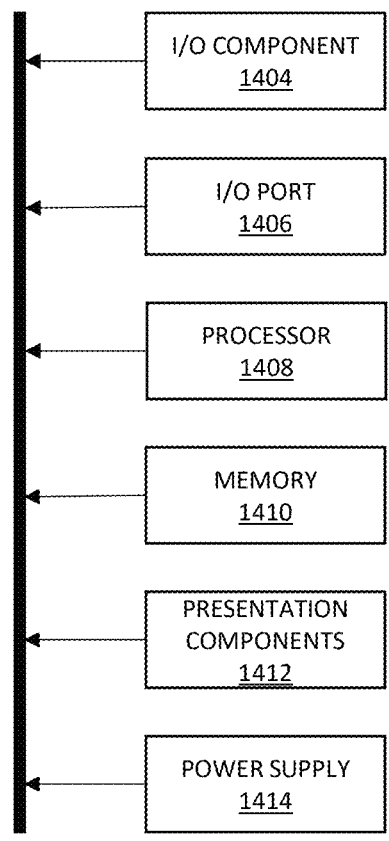
FIG. 14 is a schematic diagram illustrating an example embodiment of a device according to some embodiments of the present disclosure.

Turning now to FIG. 14, FIG. 14 is a schematic diagram illustrating an example embodiment of a device 1400 (e.g., a client device, a computing device) that may be used within the present disclosure. In some embodiments, device 1400 may be a source 202, a display 204, a Tx speaker unit 206, a Rx speaker unit 208, a Rx speaker unit 210, or a combination thereof as described with respect to FIG. 2. The device 1400 is merely an illustrative example of a suitable computing environment and in no way limits the scope of the present disclosure. As used herein, a "device" or "computing device" can include a "workstation," a "server," a "laptop," a "desktop," a "hand-held device," a "mobile device," a "tablet computer," or other computing devices, as would be understood by those of skill in the art. Embodiments of the present disclosure may utilize any number of devices 1400 in any number of different ways to implement a single embodiment of the present disclosure. Accordingly, embodiments of the present disclosure are not limited to a single device 1400, as would be appreciated by one with skill in the art, nor are they limited to a single type of implementation or configuration of the example device 1400.

In some embodiments, device 1400 may include a bus 1402 that can be coupled to one or more of the following illustrative components, directly or indirectly: input/output (I/O) component 1404, I/O port 1406, one or more processors 1408, one or more memories 1410, one or more presentation components 1412, and power supply 1414. One of skill in the art will appreciate that the bus 1402 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices.

In some embodiments, device 1400 can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CD-ROM, digital versatile disks (DVD) or other optical or holographic media, and magnetic storage devices that can be used to encode information and can be accessed by the devices 1400.

In some embodiments, memory 1410 can include computer-storage media in the form of volatile and/or nonvolatile memory. In some embodiments, memory 1410 may be removable, non-removable, or any combination thereof. For example, in some embodiments, memory 1410 may be a hardware device such as hard drives, solid-state memory, optical-disc drives, and the like.

In some embodiments, device 1400 can include one or more processors that read data from components such as the memory 1410, the various I/O components 1404, etc. In some embodiments, presentation components 1412 present data indications to a user or other device. For example, in some embodiments, presentation components 1412 may include a display device, speaker, a printing component, a haptic component, etc.

In some embodiments, the I/O ports 1406 can enable the device 1400 to be logically coupled to other devices, such as I/O components 1404. In some embodiments, some of the I/O components 1404 can be built into the device 1400. In some embodiments, I/O component 1404 may be a microphone, joystick, recording device, game pad, satellite dish, scanner, printer, wireless device, networking device, and the like. In some embodiments, I/O port 1406 may utilize one or more communication technologies, such as USB, infrared, Bluetooth™, or the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:

receiving, by at least one processor of at least one speaker unit in a group of networked speaker units, an audio signal associated with at least one audio source from the group of networked speaker units;

wherein the audio signal represents audio produced by the at least one audio source and captured by at least one beamforming microphone associated with the at least one speaker unit, wherein the audio signal comprises a plurality of location estimates determined by the group of networked speaker units, wherein the plurality of location estimates comprises a plurality of distance estimates and a plurality of angle of arrival estimate relative to a plurality of other frames of reference associated with group of networked speaker units;

projecting, by the at least one processor, the plurality of distance estimates onto the coordinate system;

projecting, by the at least one processor, the plurality of angle of arrival estimates onto the coordinate system;

determining, by the at least one processor, an angle of arrival of the audio to the at least one speaker unit based at least in part on a combination of the plurality of angle of arrival estimates, wherein the at least one speaker unit utilizes at least one beamforming technique associated with the at least one beamforming microphone;

determining, by the at least one processor, a distance of the at least one audio source from the at least one speaker unit based at least in part on a time of arrival of the audio at the at least one speaker unit and the combination of the plurality of distance estimates; and determining, by the at least one processor, a location of the at least one audio source within a coordinate system associated with the group of networked speaker units.

2. The method of claim 1, wherein the at least one audio source comprises at least one user.

3. The method of claim 1, wherein the at least one audio source comprises at least one receiver speaker unit.

4. The method of claim 1, further comprising:

synchronizing clocks of the plurality of other speaker units within a network using a precision time protocol.

5. The method of claim 1, wherein the coordinate system comprises a Cartesian grid and the distance and angle of arrival are converted from polar coordinates to Cartesian coordinates.

6. The method of claim 1, wherein determining the location further comprises applying a probability weighting factor to at least one of the distance estimates or the angle of arrival estimates based on confidence of detection.

7. The method of claim 1, wherein the group of networked speaker units communicate wirelessly using multicast transmission of audio signals.

8. A transmitter speaker device comprising:

at least one speaker;

at least one beamforming microphone; and at least one processor configured to:

receive, from at least one transmitter speaker unit in a group of networked speaker units, an audio signal associated with at least one audio source from the group of networked speaker units;

wherein the audio signal represents audio produced by the at least one audio source and captured by the at least one beamforming microphone, wherein the audio signal comprises a plurality of location estimates determined by the the group of networked speaker units; wherein the plurality of location estimates comprise a plurality of distance estimates and a plurality of angle of arrival estimate relative to a plurality of other frames of reference associated with the group of networked speaker units;

project the plurality of distance estimates onto the coordinate system;

project the plurality of angle of arrival estimates onto the coordinate system;

determine an angle of arrival of the audio to the at least one speaker unit based a least in part on a combination of the plurality of angle of arrival estimates, wherein the at least one speaker unit at least one beamforming technique associated with the at least one beamforming microphone;

determine a distance of the at least one audio source from the at least one speaker unit based at least in part on a time of arrival of the audio at the at least one speaker unit and a combination of the plurality of distance estimates;

determine a location of the at least one audio source within a coordinate system associated with the group of networked speaker units based at least in part on a combination of the plurality of distance estimates; and adjust playback of the audio signal based at least in part on the location.

9. The transmitter speaker device of claim 8, wherein the at least one audio source comprises at least one user.

10. The transmitter speaker device of claim 8, wherein the at least one audio source comprises at least one receiver speaker unit.

11. The transmitter speaker device of claim 8, wherein the at least one processer synchronizes clocks of the group of networked speaker units using a precision time protocol.

12. The transmitter speaker device of claim 8, wherein the processor is further configured to: combine location estimates received from the group of networked speaker units by projecting the estimates into the coordinate system of the transmitter speaker device.

13. The transmitter speaker device of claim 8, wherein adjusting playback comprises modifying equalization parameters to emphasize frequencies directed toward the audio source.

14. The transmitter speaker device of claim 8, wherein playback is adjusted by adjusting equalization in a room associated with the transmitter speaker device.

15. The transmitter speaker device of claim 8, wherein processor is further configured to discard the location estimates below a threshold probability of accuracy.

16. A receiver speaker device comprising:
at least one speaker;
at least one beamforming microphone; and
at least one processor configured to:
receive an audio signal associated with at least one audio source from a group of networked speaker units;
wherein the audio signal represents audio produced by the at least one audio source and captured by the at least one beamforming microphone associated with the receiver speaker device, wherein the audio signal comprises a plurality of location estimates determined by the networked group of speaker units, wherein the plurality of location estimates comprises a plurality of distance estimates and a plurality of angle of arrival estimate relative to a plurality of other frames of reference associated with the group of networked speaker units;
project the plurality of distance estimates onto the coordinate system;
project the plurality of angle of arrival estimates onto the coordinate system;
determine an angle of arrival of the audio to the at least one speaker unit based at least in part on a combination of the plurality of angle of arrival estimates, wherein the at least one speaker utilizes at least one beamforming technique associated with the at least one beamforming microphone;
determine a distance of the at least one audio source from the at least one speaker unit based at least in part on a combination of the plurality of angle of arrival estimates;
determine a location of the at least one audio source within a coordinate system associated with the group of networked speaker units; and
adjust playback of the audio signal based at least in part on the location.

17. The receiver speaker device of claim 16, wherein the at least one audio source comprises at least one user.

18. The receiver speaker device of claim 16, wherein the at least one audio source comprises at least one receiver speaker unit.

19. The receiver speaker device of claim 16, wherein the at least one processor is further configured to synchronize clocks of the networked group of speaker units within a network using a precision time protocol.

20. The receiver speaker device of claim 16, wherein processor is further configured to discard the location estimates below a threshold probability of accuracy.

* * * * *